US006275749B1

(12) United States Patent
Saville et al.

(10) Patent No.: US 6,275,749 B1
(45) Date of Patent: *Aug. 14, 2001

(54) INTERRUPT-CONTROLLED THREAD PROCESSING

(75) Inventors: Winthrop L. Saville, Soquel; Kevin Ross, Sunnyvale, both of CA (US)

(73) Assignee: Philips Electronics North America Corporation, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/218,551

(22) Filed: Dec. 22, 1998

(51) Int. Cl.[7] .......................... G05D 11/00; G05D 17/00; G05D 3/12; G05D 5/00; G05D 9/00
(52) U.S. Cl. .......................... 700/292; 712/207; 712/210; 712/212; 712/222; 712/228; 709/102; 709/103; 709/107; 709/108; 710/260
(58) Field of Search .......................... 700/292; 709/108, 709/102, 103, 314, 107; 710/260; 712/25, 207, 41, 222, 228, 229, 210, 212

(56) References Cited

U.S. PATENT DOCUMENTS

| 4,074,353 | 2/1978 | Woods et al. .......................... 710/264 |
| 4,410,939 | 10/1983 | Kawakami .......................... 364/200 |
| 5,142,677 | 8/1992 | Ehlig et al. .......................... 709/108 |
| 5,349,680 | 9/1994 | Fukuoka .......................... 709/108 |
| 5,353,418 | 10/1994 | Nikhil et al. .......................... 709/108 |
| 5,428,779 | 6/1995 | Allegrucci et al. .......................... 709/108 |
| 5,438,669 | * 8/1995 | Nakazawa et al. .......................... 712/222 |
| 5,550,993 | 8/1996 | Ehlig ey al. .......................... 712/229 |
| 5,560,029 | * 9/1996 | Papadopoulos et al. .......................... 712/25 |
| 5,600,837 | * 2/1997 | Artieri .......................... 709/103 |
| 5,659,749 | 8/1997 | Mitchell et al. .......................... 709/108 |
| 5,696,957 | 12/1997 | Yamaura et al. .......................... 712/228 |
| 5,724,565 | * 3/1998 | Dubey et al. .......................... 709/102 |
| 5,742,782 | 4/1998 | Ito et al. .......................... 712/210 |
| 5,742,822 | 4/1998 | Motomura .......................... 709/102 |
| 5,887,166 | * 3/1999 | Mallick et al. .......................... 709/102 |
| 5,896,517 | * 4/1999 | Wilson .......................... 712/207 |
| 5,933,627 | * 8/1999 | Parady .......................... 712/228 |

FOREIGN PATENT DOCUMENTS

| 0134386A2 | 3/1985 | (EP) .......................... G06F/9/44 |
| 0565849A2 | 10/1993 | (EP) .......................... G06F/9/44 |
| WO9203783 | 3/1992 | (WO) .......................... G06F/9/46 |

OTHER PUBLICATIONS

Tsai et al., Performance Study of a Concurrent Multi-threaded Processor*, IEEE., pp. 24–35, Jun. 1998.*
Huelsbergen, Dynamic Parallelization of Modifications to Directed Acyclic Graphs, 1996, IEEE, pp. 186–197.*

* cited by examiner

Primary Examiner—William A. Cuchlinski, Jr.
Assistant Examiner—McDieunel Marc

(57) ABSTRACT

Rapid thread processing is performed by associating thread contexts stored in a remote memory with interrupts for controlling the operation of a hardware-accelerated processor. This both minimizes the use of registers in the processor and provides a flexible, remotely accessible storage medium for the thread contexts.

4 Claims, 2 Drawing Sheets

INTERRUPT-CONTROLLED THREAD PROCESSING

BACKGROUND OF THE INVENTION

1. Field of the Invention

The invention relates to thread-oriented processing and, in particular, to multiple-thread processing by the use of contexts.

2. Description of Related Art

In multiple-thread processing, a processor is capable of successively performing a plurality of different processes (commonly referred to as "threads"). Upon the occurrence of a particular event, such as after the elapse of a predetermined time period or upon the receipt of a specific command, the processor suspends performance of one thread, stores a context describing the status of the thread being suspended, and begins performing another thread, which is also described by a respective context. Each "context" describes information needed for the processor either to initiate operation on a new thread or to continue operation on a suspended thread. Typically this information identifies memory addresses containing the initial or next operation of a respective thread to be performed and any data to be operated on.

In order to provide direct and rapid access to stored thread contexts, some processors include multiple banks of local context registers. This, however, is an inflexible arrangement which limits to a fixed quantity the number of threads that can be performed. It is also inefficient whenever the number of threads is smaller than the number of register banks provided.

Alternatively, the multiple contexts can be stored in a separate memory. Various examples of such an approach are described in U.S. Pat. No. 5,349,680. In one of these examples, described in the patent as a conventional information processing apparatus, a main processor includes both an application supporting unit for successively performing operations from different application processes and a system supporting unit for controlling the operation in the information processing apparatus. The efficiency of this arrangement is described as inferior, because the application supporting unit and the system supporting unit are never operated at the same time. U.S. Pat. No. 5,349,680 proposes alternative arrangements utilizing multiple stored contexts, but each of these arrangements requires the use of two separate processors. This is an expensive way to improve efficiency.

SUMMARY OF THE INVENTION

It is an object of the invention to enable rapid and efficient multiple-thread processing by a single processor that does not suffer from the inflexibility of utilizing a fixed number of local context registers.

This and other objects are achieved by utilizing interrupt-controlled swapping of contexts between a processor and a memory. This enables rapid multiple-thread processing with a minimum of hardware and also has the advantage of conserving electrical power requirements. In accordance with the invention, a method is employed which includes:

associating each of the interrupts with a predetermined remote memory location;

storing in the predetermined locations a plurality of thread context pointers, each of said pointers identifying a remote memory location for containing a thread context associated with one of said threads;

producing, in response to the occurrence of any of the interrupts, an address identifying the associated memory location;

reading the thread context pointer from the memory location identified by the address;

reading the thread context from the memory location identified by the thread context pointer read; and performing the thread associated with the thread context read.

Note that the word "memory", as used herein, is intended to be interpreted as generally as is consistent with the manner in which it is used and includes, without limitation, volatile and non-volatile devices of various types, such as registers, RAMs, DRAMs, ROMs etc. Further, "local memory" means a memory included in the processor and "remote memory" means a memory not included in the processor. Additionally, "copying" means reading information from one memory and writing it into another.

DESCRIPTION OF THE PREFERRED EMBODIMENTS

Figure 1:
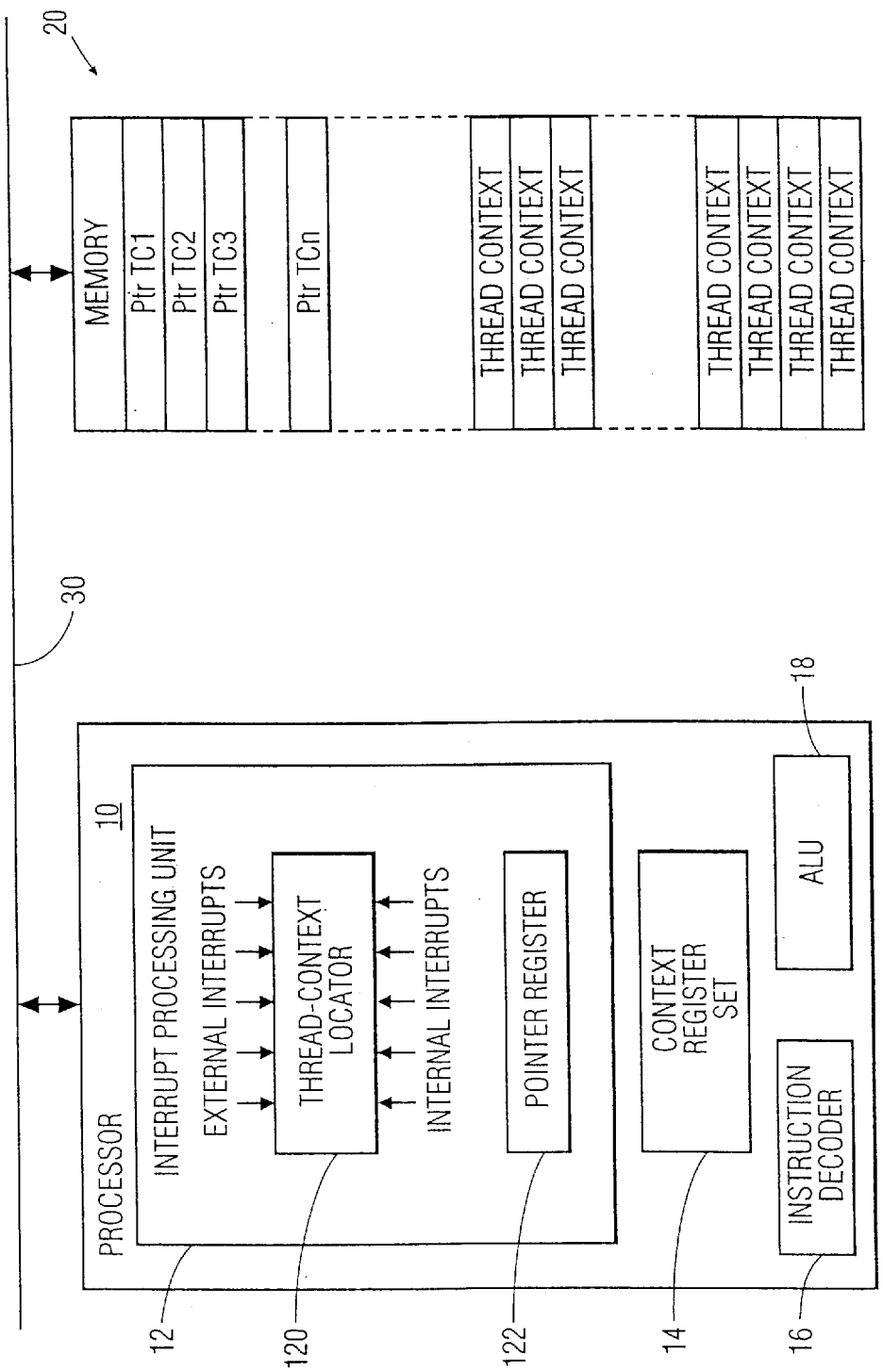
FIG. 1 is a diagram which generally illustrates operation of a multiple-thread processing system in accordance with an embodiment of the invention.

The multiple-thread processing system of FIG. 1 includes a single processor 10 and a memory 20. The exemplary processor 10 is a hardware-accelerated unit which utilizes clock pulses to sequence through instructions read in response to interrupts. The processor includes an interrupt processing unit 12, a context register set 14, an instruction decoder 16 and an arithmetic logic unit 18. The memory 20, in this exemplary embodiment, comprises a RAM having a multiplicity of memory locations for storing a plurality of thread context pointers ptrTC1, ptrTC2, ptrTC3, . . . ptrTCn, and a plurality of thread contexts.

The processor 10 and the memory 20 are connected to a common bus 30 for communicating with each other and with other hardware that is connected to the bus. Preferably, this is a high-speed bus, typically on the same silicon substrate, and the memory accesses have low latency. Examples of external memory include SDRAM, EDO-DRAM, and SRAM.

Operation of the processor 10 is controlled entirely by interrupts and by op-codes which, e.g., force the processor to switch/store threads. The interrupts may be either external interrupts received from the bus 30 or internal interrupts generated within the processor itself, e.g., from a timer in the processor. Each of the external interrupts is associated with a predetermined location in the memory 20 where one of the thread context pointers ptrTC1, ptrTC2, ptrTC3, . . . ptrTCn is stored. Each of these pointers is associated with one of the thread contexts that is utilized by hardware connected to the bus 30 and identifies the memory location where the specific context is stored. Note that more than one of the pointers (e.g. ptrTC1 and ptrTC3) may be associated with (i.e. "share") the same thread context and, thus, identify the same memory location. This is useful if, for example, more than one apparatus connected to the bus 30, e.g. a receive FIFO and a transmit FIFO, utilize the same context. Each of the internal interrupts is associated with a predetermined location in the memory 20 where one of the thread contexts utilized by the processor is stored.

If a context is shared, the processing time is longer, because the interrupt service thread must determine the source of the interrupt. However, less memory is needed. Conversely, if an interrupt makes exclusive use of a context, the interrupt service thread can inherently identify the source of the interrupt and the processing response time is shorter. This provides a system architect with flexibility.

All of the interrupts are processed by the interrupt processing unit 12, which includes a thread context locator 120 and a pointer register 122. The thread context locator 120 produces addresses identifying the memory locations that are associated with the external and internal interrupts. In response to each of the external interrupts, the thread context locator produces an address identifying the predetermined location in the memory 20 where the associated one of the thread context pointers ptrTC1, ptrTC2, ptrTC3, . . . ptrTCn is stored. The processor then reads the thread context location from this memory location into the pointer register 122. In response to each of the internal interrupts, the thread context locator directly produces and transfers to pointer register 122 an address identifying the predetermined location in the memory where the thread context associated with the respective internal interrupt is stored.

Examples of external interrupts include FIFO TRANSMIT COMPLETE, FIFO DATA RECEIVED, DMA TRANSFER COMPLETE, FIFO TRANSMIT FAILURE etc. Examples of internal interrupts include internal timers etc.

Preferably the thread-context locator comprises a dedicated priority-sensitive hardware component for producing the addresses, such as a programmable look-up table or an encoder, both of which are well known in the art. This both maximizes addressing speed and enables processing of higher priority interrupts before lower priority interrupts.

The context register set 14 comprises a plurality of registers for containing the context of the thread currently being performed by the processor 10. In the preferred embodiment, the register set 14 includes:

a program counter register which continually updates to identify the next program address in the memory 20 to be accessed;

one or more general purpose pointer registers for temporarily storing memory addresses; and one or more data registers for containing data which is either read from the memory 20 or produced by the arithmetic logic unit 18.

The instruction decoder 16 is a conventional hardware component, such as a sequencer or micro-sequencer, for converting the instructions read from the memory 20 to lower-level operation codes to be executed by the arithmetic logic unit 18. The arithmetic logic unit is also a conventional hardware component.

Figure 2:
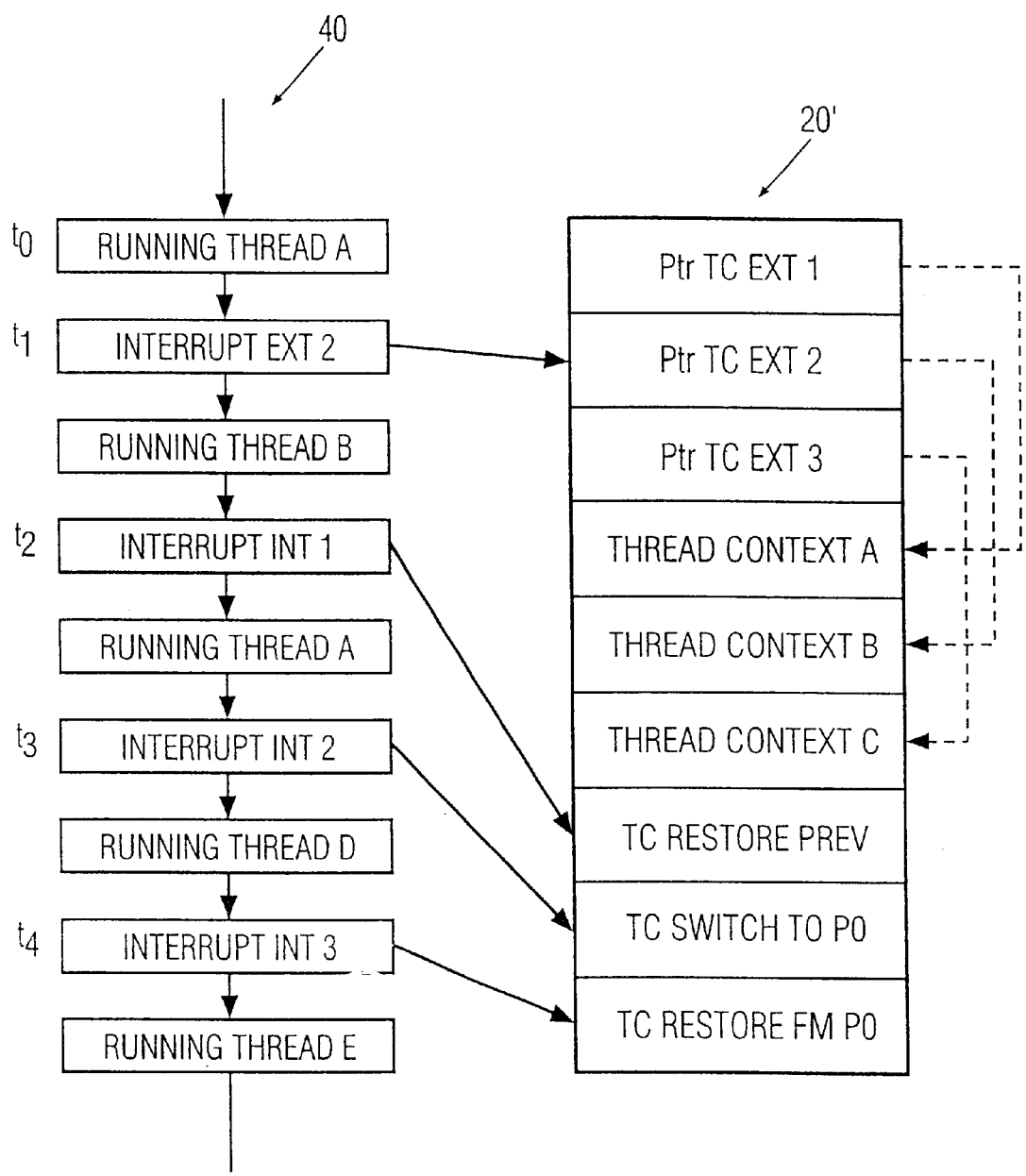
FIG. 2 is a diagram which illustrates operation of the multiple-thread processing system of FIG. 1 with a specific set of pointers and thread contexts stored in memory.

Operation of the processor 10 under the control of a plurality of exemplary interrupts, occurring sequentially, is illustrated in FIG. 2. The boxes 40 represent the sequentially occurring interrupts. The boxes 20' represent the locations in the memory 20 containing specific pointers and thread contexts which are read by the processor 10 in response to certain external interrupts EXT 1, EXT 2, EXT 3 and to certain internal interrupts INT 1, INT 2, INT 3. In this specific example, the memory locations 20' contain, respectively:

the pointer Ptr TC EXT 1 which is read by the processor in response to interrupt EXT 1 and which comprises the memory location of an associated thread context THREAD CONTEXT A;

the pointer Ptr TC EXT 2 which is read by the processor in response to interrupt EXT 2 and which comprises the memory location of an associated thread context THREAD CONTEXT B;

the pointer Ptr TC EXT 3 which is read by the processor in response to interrupt EXT 3 and which comprises the memory location of an associated thread context THREAD CONTEXT C;

the thread context THREAD CONTEXT A;

the thread context THREAD CONTEXT B;

the thread context THREAD CONTEXT C;

the thread context TC RESTORE PREV, which is read by the processor in response to interrupt INT 1;

the thread context TC SWITCH TO P0, which is read by the processor in response to interrupt INT 2; and the thread context TC RESTORE FM P0, which is read by the processor in response to interrupt INT 3.

Op-codes Switch Prev TC, Restore Prev TC, Switch To P0 and Restore From P0 are parts of a program stream (or the command sequence that forms the program). They are read from the program stream as the Program Counter points to them as the program is read from memory.

The sequence shown in FIG. 2 begins at a time $t_0$, when the processor is performing a thread A represented by THREAD CONTEXT A that is contained in the context register set. For purposes of simplicity, it will be presumed that the interrupts are enabled and will be performed when they occur, otherwise, the interrupt processing unit 12 will postpone performance of the newly-received interrupt.

At time $t_1$ the processor 10 receives from the bus 30 the external interrupt EXT 2. In response to this interrupt:

the processor copies the thread context currently contained in the context register set 14, i.e. the context for thread A (THREAD CONTEXT A), into the memory location identified by the current thread context address contained in one of the general-purpose pointer registers in the context register set 14;

the thread context locator 120 produces the address identifying the memory location associated with external interrupt EXT 2, i.e. the memory location where pointer Ptr TC EXT 2 is stored;

the processor copies the pointer Ptr TC EXT 2, identifying the memory location of THREAD CONTEXT B, into the pointer register 122;

the processor copies this thread context into the context register set 14 and begins performing thread B.

At time $t_2$, after finishing the performance of thread B, the processor 10 internally services the op-code Restore Prev. by performing the following steps:

the thread context locator 120 directly produces the address identifying the memory location associated with op-code service, i.e. the memory location where the thread context TC RESTORE PREV is stored, by copying the address from a Prev TC register in the context register set into the pointer register 122;

the processor copies this thread context into the context register set 14 and performs the op-code RESTORE PREV.

Performance of the op-code RESTORE PREV restores the context of the previously-interrupted thread without storing the context currently in the context register set 14 (i.e., the context of thread B). In this case, the processor copies THREAD CONTEXT A (from the memory location still contained in pointer register 122) into the context register set 14. This causes the processor to re-institute the performance of thread A.

At time $t_3$, in response to instructions read from the memory 20 in the performance of thread A, the processor services the op-code SWITCH TO P0. The thread context associated with this interrupt, i.e. TC SWITCH TO P0, enables a switch from one thread to another which is not identified in the pointer register or by any of the pre-stored thread context pointers ptrTC1, ptrTC2, ptrTC3, ... ptrTCn that are associated with the external interrupts. To facilitate this switch, one of the instructions which precedes the actual interrupt will store in a P0 register that is included in the context register set the address identifying the location of the context for the thread to be switched to. In this example, the switch will be from current thread A to a thread D located somewhere in the memory 20. In response to this op-code:

- the processor copies THREAD CONTEXT A into the memory location identified by the current thread context address contained in one of the general-purpose pointer registers in the context register set 14;
- the thread context locator 120 directly produces the address identifying the memory location associated with the op-code, i.e. the memory location where the thread context TC SWITCH TO P0 is stored, by copying the address from the P0 register in the context register set into the pointer register 122);
- the processor copies this thread context (THREAD CONTEXT D) into the context register set 14;
- the processor begins performing thread D.

At time $t_4$ the processor 10 services the op-code RESTORE FROM P0. In response to this op-code:

- the thread context locator 120 directly produces the address identifying the memory location associated with this op-code, i.e. the memory location where the thread context TC RESTORE FM P0 is stored, by copying the address from the P0 register in the context register set into the pointer register 122;
- the processor copies this thread context into the context register set 14 and performs the op-code RESTORE FM P0.

The op-code RESTORE FM P0 is similar to the op-code SWITCH TO P0, but restores the context of a previously-interrupted thread without storing the context currently in the context register set 14. The op-code RESTORE FM P0 enables restoration of a thread which is not identified in the pointer register 122 or by any of the pre-stored thread context pointers ptrTC1, ptrTC2, ptrTC3, ... ptrTCn that are associated with the external interrupts. To facilitate this restoration, one of the instructions which precedes the actual interrupt will store in the P0 register, which is included in the context register set, the address identifying the location of the context for the thread to be restored. In this example, a thread E will be restored by copying the address for THREAD CONTEXT E from the P0 register to the pointer register and then copying this thread context into the context register set.

What is claimed is:

1. A method of operating a single processor in response to interrupts to perform a plurality of threads, said method comprising:

a. associating each of the interrupts with a predetermined remote memory location;
 b. storing in the predetermined locations a plurality of thread context pointers, each of said pointers identifying a remote memory location for containing a thread context associated with one of said threads;
 c. producing, in response to the occurrence of any of the interrupts, an address identifying the associated memory location;
 d. reading the thread context pointer from the memory location identified by the address;
 e. reading the thread context from the memory location identified by the thread context pointer read; and
 f. performing the thread associated with the thread context read.

2. A method as in claim 1 where each of the thread context pointers identifies a different memory location.

3. A method as in claim 1 where more than one of the thread context pointers identifies the same memory location.

4. A method of operating a single processor in response to a plurality of external and internal interrupts to perform a plurality of threads, said method comprising:

a. associating each of the external interrupts with a respective one of a first plurality of predetermined remote memory locations;
 b. associating each of the internal interrupts with a respective one of a second plurality of predetermined remote memory locations;
 c. storing in each of the first plurality of predetermined locations a respective thread context pointer, each identifying a remote memory location for containing a thread context associated with a respective one of the threads;
 d. storing in each of the second plurality of predetermined locations a respective thread context, each being associated with a respective one of the threads;
 e. in response to the occurrence of any of the external interrupts:
  i. producing an address identifying the associated one of the first plurality of memory locations;
  ii. reading the thread context pointer from the memory location identified by the address;
  iii. reading the thread context from the memory location identified by the thread context pointer read;
 f. in response to the occurrence of any of the internal interrupts:
  i. directly producing a thread context address identifying the associated one of the second plurality of memory locations;
  ii. reading the thread context from the memory location identified by the directly produced address;
 g. performing the thread associated with the thread context read.

\* \* \* \* \*